J. AND C. J. BAMFORD.
MOTOR DRIVEN AGRICULTURAL IMPLEMENT, TRACTION ENGINE, MOTOR LORRY, AND THE LIKE.
APPLICATION FILED APR. 18, 1918.
1,400,012.
Patented Dec. 13, 1921.
4 SHEETS—SHEET 1.
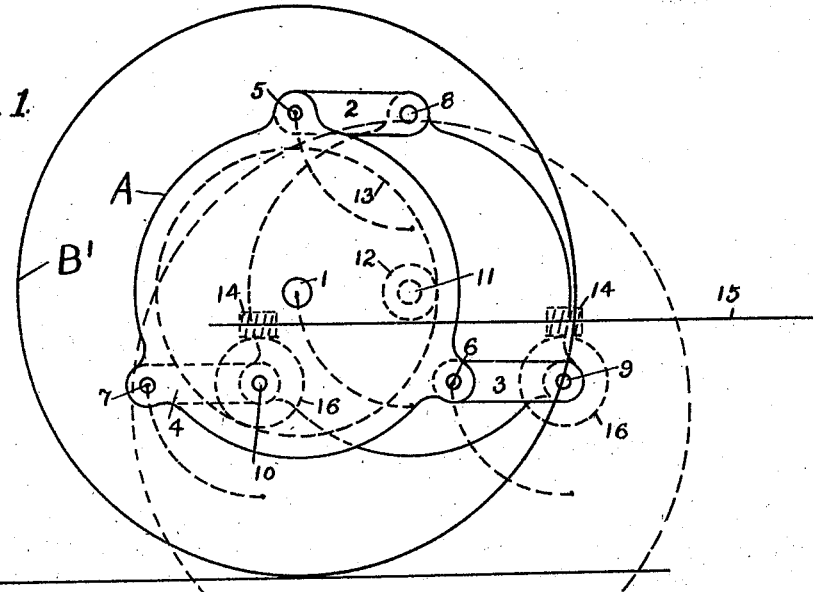
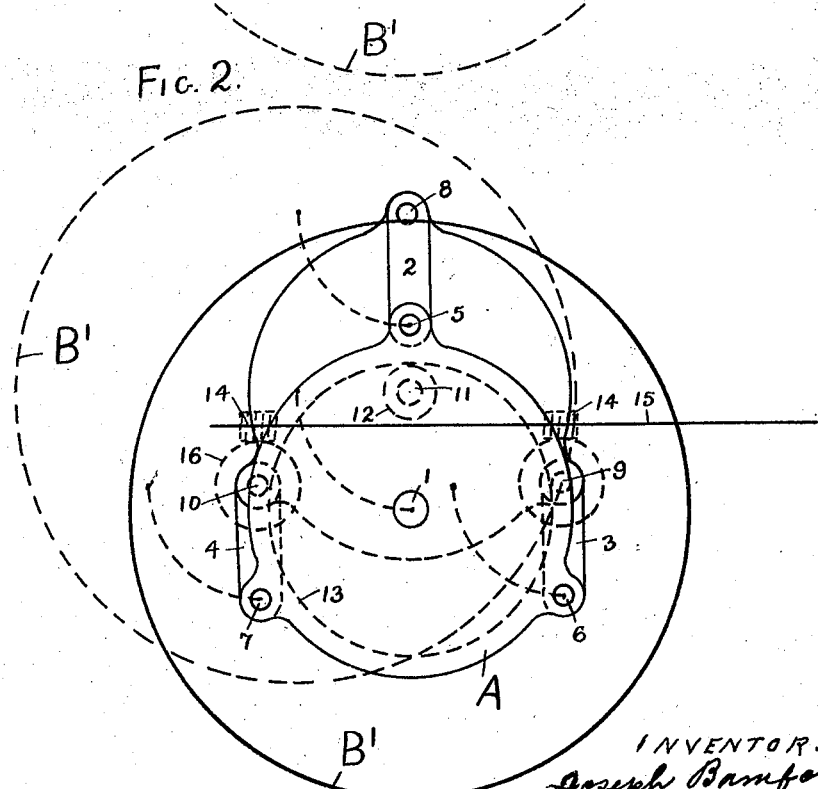

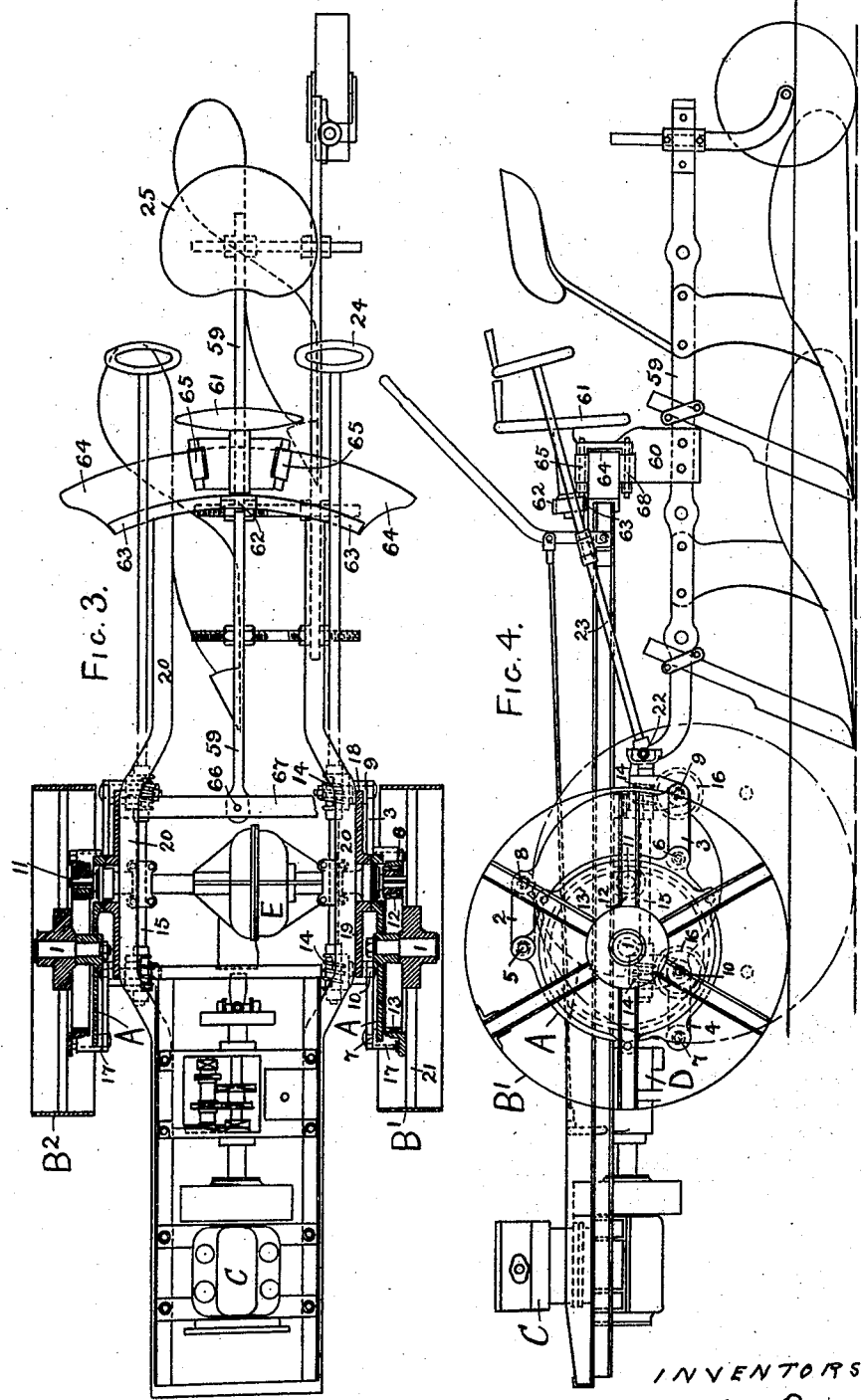

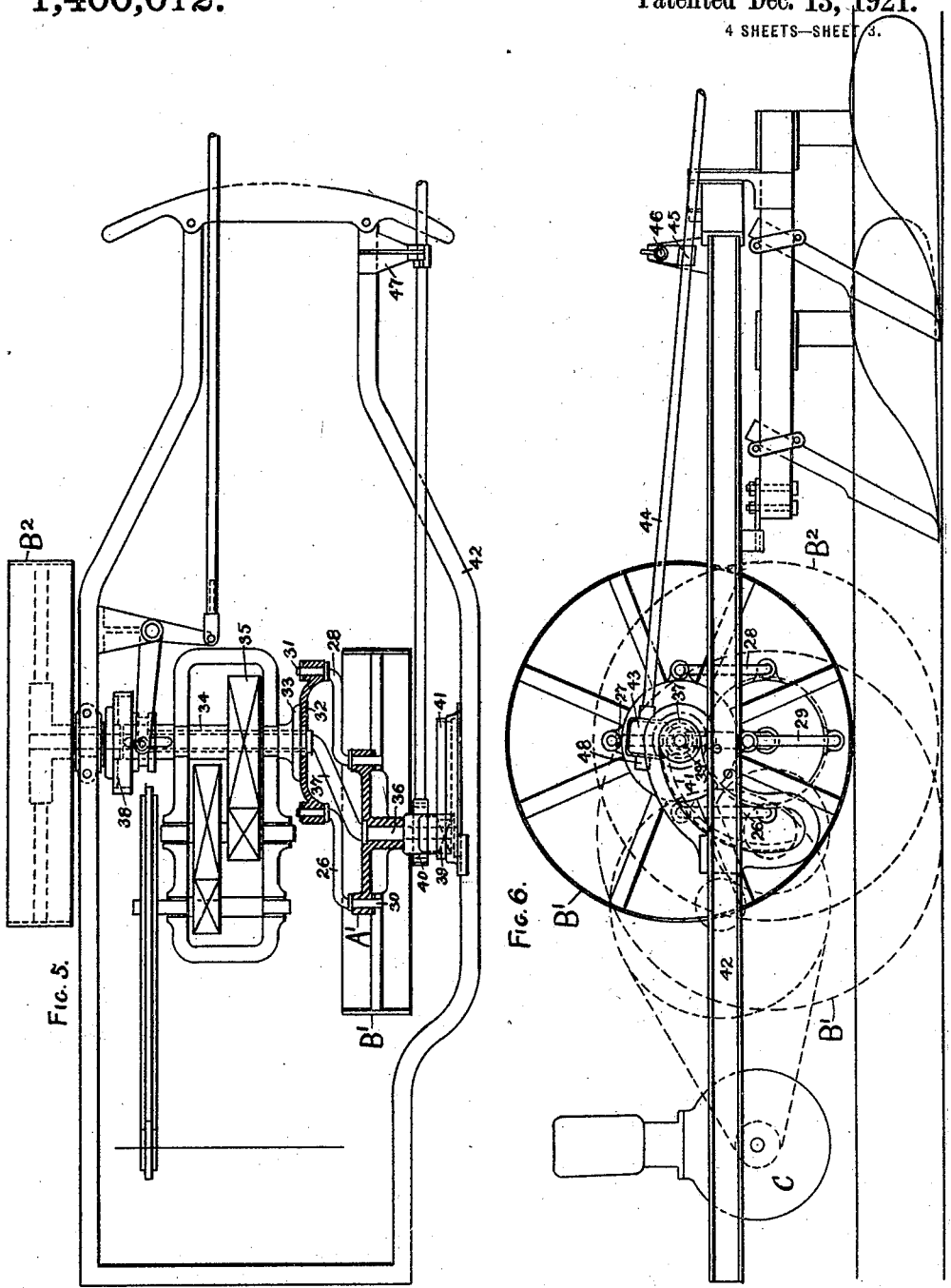

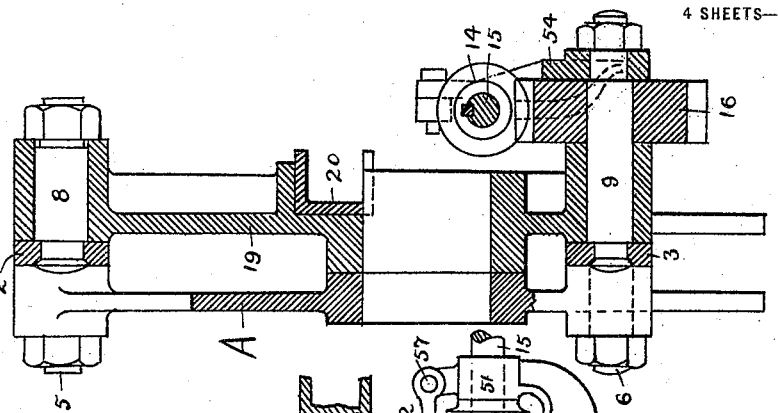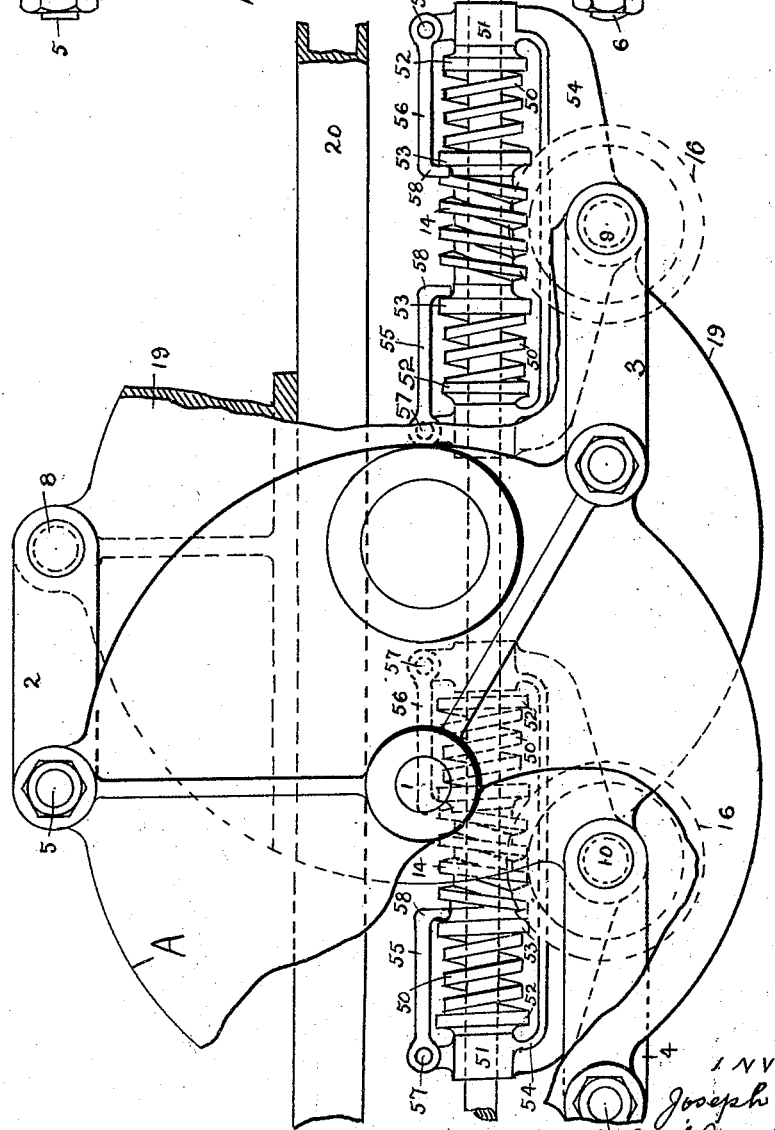

UNITED STATES PATENT OFFICE.

JOSEPH BAMFORD AND CYRIL JOSEPH BAMFORD, OF UTTOXETER, ENGLAND.

MOTOR-DRIVEN AGRICULTURAL IMPLEMENT, TRACTION-ENGINE, MOTOR-LORRY, AND THE LIKE.

1,400,012.     Specification of Letters Patent.     Patented Dec. 13, 1921.

Application filed April 18, 1918. Serial No. 229,375.

*To all whom it may concern:*

Be it known that we, JOSEPH BAMFORD and CYRIL JOSEPH BAMFORD, residing, respectively, at St. Mary's Mount, Uttoxeter, England, and The Parks, Uttoxeter, England, subjects of His Majesty the King of Great Britain and Ireland, have invented certain new and useful Improvements Relating to Motor-Driven Agricultural Implements, Traction-Engines, Motor-Lorries, and the like, of which the following is a specification.

This invention has reference to motor driven agricultural implements (and particularly to motor driven plows and to tractors used for plowing) traction engines, motor lorries and the like, of that type in which one or more of the motor driven running wheels can be independently raised or lowered relatively to the frame of the implement, vehicle or the like and axial center of the motor transmission as is necessary when the wheel or wheels on one side are required to run in a furrow or along the lower side of a road which has a considerable camber. Heretofore various means have been employed whereby the said independent adjustment of the running wheel or wheels can be effected while the axial centers of the motor transmission shaft and the running wheel or wheels driven thereby remain constant for any position.

According to this invention the axial center of the motor driven running wheel, or of each of the motor driven running wheels, is carried by a member which is adapted to be raised or lowered and is so controlled by a link or links jointed to said member and to a center or centers other than the axial center of the motor transmission shaft or the like that the said member with the vehicle wheel can by the controlling link or links be raised or lowered but the distance between the axial centers of the vehicle wheel and the motor transmission shaft or the like will remain constant for all positions, and the driving gear of the same will be unaffected. The distance between the jointed ends of the controlling link or links must be practically equal to the distance between the axial centers of the running wheel and the motor transmission shaft, and when only one of the said controlling links is employed then in combination with this suitable means, such for instance as the axial center pin of the running wheel being mounted in a radial slotted bracket fixed on the frame of the machine, must be provided to maintain a constant distance between the axial centers of the running wheel and the motor transmission shaft or the like.

Our said invention can be carried into practice in various ways, some of which by way of examples we will now describe by referring to the accompanying drawings, but it must be understood that our invention is not limited to any of these particular arrangements.

Of these drawings Figures 1 and 2 are diagrammatic views illustrating one arrangement of our invention, Fig. 1 showing the motor driven running wheel and the member by which it is carried in their raised position while Fig. 2 shows said parts in their lowered position;

Fig. 3 is a part sectional plan of a motor plow with one arrangement of our invention applied thereto;

Fig. 4 is a side elevation of the motor plow shown in Fig. 3;

Fig. 5 is a part sectional plan of a motor plow with another arrangement of our invention applied thereto;

Fig. 6 is a side elevation of the motor plow shown in Fig. 5 but with the adjustable running wheel raised;

Fig. 7 is a side elevation and Fig. 8 is a cross sectional elevation of an arrangement of springs which can be combined with the mechanism shown in Figs. 1, 2, 3, and 4 for the purpose of absorbing shocks on the plow or vehicle and also comprising a block or stop to put the said springs out of action when they are not required.

In one arrangement of our invention (see Figs. 1 and 2) the member A to which the axle pin of the running wheel $B^1$ is fixed is made as a disk or plate carried by three controlling links 2, 3, 4, jointed respectively at 5, 6, 7 to the periphery of the member A at equal distances apart and jointed respectively at 8, 9, 10, to fixed brackets or parts of the frame of the implement or vehicle or the like. The length of each of the links 2, 3, 4, from center to center is substantially the same as the distance between the axial center 1 of the running wheel and the axial center of the driving shaft or the like 11 of the motor transmission. The links 2, 3, 4, are parallel with one another and it follows that as the member A carrying the axle pin or the like 1 of the running wheel B¹ is adjusted up or down the distance between the axial center 1 of the running wheel B¹ and the center of the motor transmission shaft 11 or the like remains constant for all positions and the transmission gearing from the one to the other is not affected. Any suitable arrangement of transmission gearing may be employed such for instance as the spur pinion 12 on the motor transmission shaft 11 or the like gearing with an internally toothed spur ring 13 fixed on the arms of the running wheel B¹. The dotted circle B¹ in Fig. 1 indicates the lowest position into which the running wheel can be turned, and the dotted circle B¹ in Fig. 2 shows the raised position of the running wheel B¹.

Suitable lifting means such for instance as worms 14 mounted on a shaft 15 and gearing with worm wheel sectors 16 on the axles 9, 10, of the links 3, 4, (or a toothed quadrant and ratchet lever or other suitable means) are provided and combined with the links 3, 4, (or there may be worm and worm wheel gearing for only one of said links) for the purpose of turning the same about their centers 9, 10 and for raising or lowering the member A and the running wheel B¹ and fixing them in their required position.

We will now refer to Figs. 3 and 4 and describe how this arrangement of our invention is applied for instance to a motor plow and this description will equally serve to enable anyone to apply this arrangement of our invention to any other motor driven agricultural implement or traction engine, motor lorry or the like of the type herein referred to.

On referring to Figs. 3 and 4 it will be seen that our invention is applied to both of the motor driven running wheels B¹, B², at the sides of the plow these wheels being driven from a cross axle 11 which in turn is driven from the motor C through change gear D and differential gear and gear box E. The running wheels B¹, B², are respectively mounted to run loosely on their stub axles 1 which are respectively fixed in the center eyes of the disk like members A which are made with bosses 17 carrying the joint pins 5, 6, 7, on which the ends of the links 2, 3, 4, are respectively jointed. The other ends of these links 2, 3, 4, are fixed on pins 8, 9, 10, which respectively turn in bosses 18 of the plate 19 which is fixed to the side of the plow frame 20. On the ends of the transverse transmission shaft 11 from the motor there are fixed the two toothed pinions 12 which are respectively geared to internally toothed rings 13 which are concentric with the axis of the running wheels and are bolted to their arms 21. The worm wheel 16 or worm wheel sectors for turning the pins 7, 8, 9, which are fixed to the links 2, 3, 4, are fixed on these pins and these worm wheels gear with worms 14 which are fixed on the horizontal shafts 15 which are connected by universal joints 22 to the hand wheel shafts 23 furnished with hand wheels 24 adjacent to the operator's seat 25 at the back of the plow.

It will be seen that by this arrangement the operator working the plow can by turning either one of the two hand wheels 24 raise or lower either of the running wheels B¹, B², independently of the other one, so that one wheel can run in any depth of furrow while the other runs on level ground or both wheels can be moved to run on the same level when desired.

The motor plow illustrated by Figs. 3 and 4 is furnished with suitable steering gear preferably consisting of the upper beam 59 of the plow (which carries the driver's seat 25 and is jointed at 66 to the cross bar 67 of the plow frame) having an upstanding bracket 60 carrying a hand wheel and shaft 61 on which is fixed a bevel pinion 62 gearing with a segmental toothed rack 63 fixed on a segmental table 64 which is fixed onto the frame 20 of the plow. The bracket 60 carries rollers 65 bearing on the top of the table 64 and similar rollers 68 bearing against the under side of the table. Thus by turning the hand wheel 61 the upper beam of the plow and the shares carried thereby can be swiveled to various angles at either side of the center line so as to steer the plow as required when out of the furrow.

Instead of the controlling links being jointed to the member and to parts fixed to or formed on the frame or body of the implement or vehicle as aforesaid, the said links may be arranged with one end of each link jointed to the member as aforesaid and the other ends of the links jointed to a disk or the like revoluble about the axial center of the motor transmission, this disk serving in fact as a driver and driving the running wheel through the links. In this case the member with the running wheel is preferably mounted on a crank shaft on which the said driving disk of the motor transmission is also mounted, means such as a pinion and toothed sector being provided for raising the outer cranked arm of the crank shaft with the running wheel up or down turning about the axial center of the motor transmission.

We will now describe the example of this arrangement of our invention applied to a motor plow as illustrated by Figs. 5 and 6. In this arrangement there are four connecting links (although there may be more or fewer than four) marked respectively 26, 27, 28, 29, arranged with their ends cranked and the ends 30 jointed in bearings in the member A¹ which is fixed to the running wheel B¹ at equal distances apart around the circumference of the same and the other ends 31 of these links are mounted at equal distances apart in bearings of a disk or the like 32 which is revoluble about the axial center of the motor transmission, this disk 32 being fixed to a flange 33 formed on the end of a bush or sleeve 34 on which is fixed the spur wheel 35 of the gearing from the motor C so that this disk 32 serves as a driver and drives the running wheel B¹ through the links. The member A¹ and the running wheel B¹ are mounted to revolve on the cranked end 36 of the cranked axle 37 on the other end of which the other running wheel B² is mounted and adapted to revolve loosely thereon this running wheel B² being driven from the bush 34 through the clutch 38 so that when turning the plow thus running wheel B² can by the clutch be thrown out of gear.

In order to raise or lower the running wheel B¹ and member A¹ about the axis of the crank shaft 37 and motor transmission as a center, a toothed pinion 39 formed with a worm wheel 40 is loosely mounted on the outer cranked end 36 of the crank shaft and this pinion 39 gearing with a toothed rack like sector 41 which is fixed to the frame 42 of the plow, and gearing with the worm wheel 40 there is a worm 43 mounted on a shaft 44 leading to a convenient position at the back of the plow and furnished with a hand wheel (not shown on our drawings) for turning the same so that the operator can by turning this shaft 44 raise or lower the running wheel B¹ and the member A¹ as may be required, the shaft 37 turning about its center to accommodate itself to the altered positions and the driving of the member A¹ by means of the links 26, 27, 28, 29, will be unaffected. The bearing 45 which carries the worm shaft 44 is made to swivel about the pin 46 which connects this bearing to the bracket 47 fixed on the frame 42, the shaft 44 also being free to slide to and fro in this bearing 45 so that the bearing will thus accommodate itself to the various positions of the worm shaft as it moves up and down. Moreover the bearing bracket 48 which carries the other end of the worm shaft 44 adjacent to the worm is mounted on the end portion of the crank shaft 36 so as to swivel thereon and also maintain the worm at the proper distance from the center of the worm wheel.

In the motor plough represented by Figs. 3 and 4 springs may be combined with the links 2, 3, 4, and arranged to absorb shocks when the motor plow is traveling, and also to permit of these links with the member A and corresponding running wheel B¹ or B² moving up or down to some extent against the pressure of the springs. Moreover a movable block or stop may be provided and adapted to be interposed between a projection on the member or some other movable part of the frame of the plow or other implement or vehicle so as to make the running wheel axle pin or the like solid when desired, that is to prevent its moving up or down against the spring or springs.

The preferred arrangement of thus springing the running wheels B¹, B², and the member A is illustrated by Figs. 7 and 8.

In this arrangement the two worms 14 and the worm shaft 15 are so arranged that the worms are capable of limited longitudinal movements in either direction on or with the worm shafts against coiled compression springs 50 which are mounted on the worm shaft 15 between the ends of the worms 14 and the bearings 51 of the worm shaft so that by this arrangement the running wheel and the member A fixed thereto can move up or down slightly when the plow or vehicle is running, as the links 2, 3, and 4 will correspondingly turn with the worms or worm wheel sectors against the compression springs 50 which will thus absorb the shocks. It is preferred to provide a collar 52 between the ends of each spring and the bearings 51, and also a similar collar 53 between the ends of the springs and the worms so as the better to take the pressure of the springs which in the particular arrangement shown are of larger diameter than the bosses of the bearings and the body of the worm. It will be seen that the bearings 51 form parts of brackets 54 which are fixed on the ends of the joint pins 9, 10, of the two links 3, 4. The movable stops or blocks which are provided to stop the springing when desired are in this arrangement of our invention conveniently made for each worm in the form of two block levers 55, 56, which are respectively jointed at 57 to the bearings 51 and the outer ends 58 of these levers are bent downwardly and shaped so as to enter between the collars 53 and the ends of the worms and thus form stops or abutments for the ends of the worms to bear against and prevent their longitudinal movements relatively to the worm wheels. Thus when the springs are not required to act, these lever stops 55, 56 are turned down to the position shown in Figs. 7 and 8 to form abutments for the ends of the worms but when the springs are required to be operative then these levers 55, 56, are turned back in the opposite direction so as to leave the worms free to move longitudinally in the one or the other direction against the springs as aforesaid.

It is to be understood that any of the known methods of transmitting the power from the engine to the road wheels may be employed in conjunction with our invention also that provision may be made for locking the differential gear, or the differential gear may be dispensed with and the known method of driving each driving wheel by a clutch which can be engaged or disengaged at will, may be utilized. Or in place of the differential gear the known system of ratchet and pawl to drive the road wheels may be employed. Further for converting the machine into a tractor for general utility purposes the plow beam 59 carrying the shares may be detached and a rear carriage substituted provided with one or more wheels to which angular or lateral displacement or both may be imparted by suitable steering mechanism.

The accompanying drawings illustrate what we consider to be the best ways of carrying our invention into practice but it must be understood that our invention is not limited to the precise details shown as these can be caried to some extent without departing from the nature of our invention. For instance as a modification of the arrangement shown in Figs. 3 and 4, instead of both of the running wheels B¹, B², being made adjustable in height only one of such wheels may be so made adjustable and the other wheel may be non-adjustable by its stub axle 1 being fixed to the frame of the machine.

What we claim as our invention and desire to secure by Letters Patent is:—

1. A device of the class described, comprising a traction wheel, a stub axle on the wheel, a disk supported on the stub axle, a driving shaft having a direct driving connection with the wheel, a plurality of links pivotally connected to said disk at one end and having their other ends pivotally mounted at fixed distances from the center of said shaft, and means for displacing said disk in relation to said shaft, said links serving to maintain a constant distance between the axial center of the driving shaft and the wheel.

2. A device of the class described, comprising a traction wheel, a stub axle on the wheel, a disk supported on the stub axle, a driving shaft having a direct driving connection with the wheel, a plurality of links for supporting said disk, and means for actuating certain of said links to lower or elevate the disk.

3. A device of the class described, comprising a frame, a traction wheel supporting the frame, a stub axle on the wheel, a disk mounted concentrically on the stub axle, a plurality of links pivoted to the frame and pivotally connected to said disk, and manually operable means for simultaneously rotating certain of said links to lower or elevate said disk.

4. A device of the class described, comprising a traction wheel, a stub axle on the wheel, a disk supported on the stub axle, a plurality of links for supporting said disk, means for actuating certain of said links to lower or elevate the disk comprising worm gears fixed to the links, a shaft, and worms on said shaft and rotatable therewith, and resilient means for restricting the longitudinal movement of the worms on the shaft.

5. A device of the class described, comprising a traction wheel, a stub axle on the wheel, a disk supported on the stub axle, a plurality of links for supporting said disk, means for actuating certain of said links to lower or elevate the disk comprising worm gears fixed to the links, a shaft, and worms on said shaft and rotatable therewith, resilient means for restricting the longitudinal movement of the worms on the shaft, and means for rendering said resilient means inactive and locking the worms against movement longitudinally.

6. A device of the class described, comprising a frame, a traction wheel supporting the frame, a stub axle on the wheel, a disk mounted on the stub axle, means for pivotally supporting the disk on said frame, means for adjusting said disk vertically, and means for absorbing the shocks to which the last mentioned means is subjected under the action of the traction wheel.

7. A device of the class described, comprising a traction wheel, a stub axle on the wheel, a disk supported on the stub axle, a driving shaft having a direct driving connection with the wheel, a disk on the side driving shaft, a link connection between said disks, and means for displacing the first mentioned disk in relation to the second mentioned disk, said links serving to maintain a constant distance between the axial centers of the driving shaft and the wheel.

In testimony whereof we affix our signatures in presence of two witnesses.

JOSEPH BAMFORD.
CYRIL JOSEPH BAMFORD.

Witnesses:
CHARLES BOSWORTH KETLEY,
ERNEST HARKER.